July 21, 1936.  H. R. HAWGOOD  2,048,503

HOBBING MACHINE

Filed May 14, 1932

INVENTOR.
Harvey R. Hawgood
BY
Hawgood and Van Horn
ATTORNEYS

Patented July 21, 1936

2,048,503

UNITED STATES PATENT OFFICE 2,048,503

HOBBING MACHINE

Harvey R. Hawgood, Cleveland, Ohio, assignor to The Lees-Bradner Company, Cleveland, Ohio, a corporation of Ohio Application May 14, 1932, Serial No. 611,396

6 Claims. (Cl. 90—4)

This invention relates to a machine for hobbing gears and the like, and more particularly to a machine by which helical teeth, threads, and other curved and inclined surfaces may be formed.

An object of the invention is to provide an improved machine which will accurately produce helical gear teeth and the like.

Another object is to provide an improved machine which will automatically compensate for any desired helix angle about which the teeth of a gear are to be formed.

Another object is to provide an improved machine which will be efficient in operation and simple in construction.

Another object is to provide an improved machine in which relatively few accurate parts are required.

Other objects will hereinafter appear.

Figure 1:
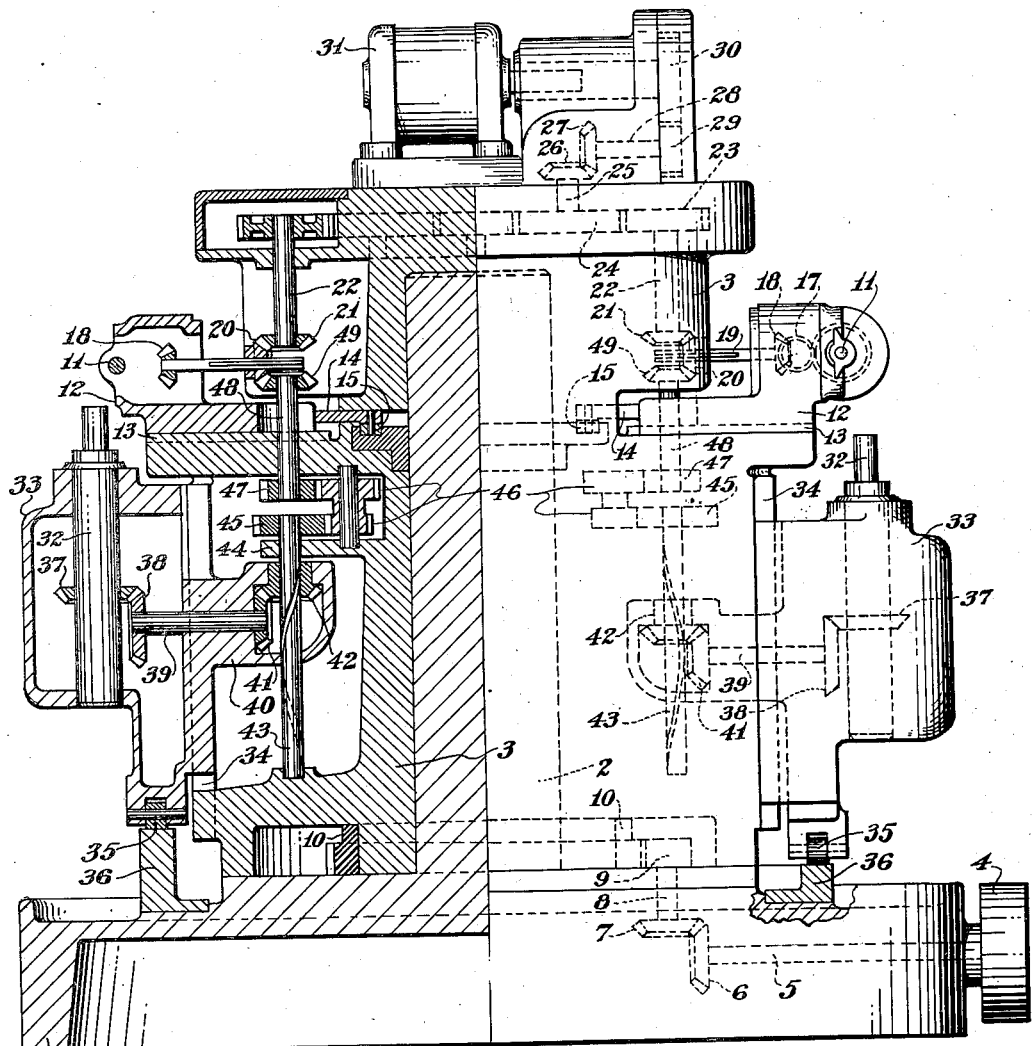
Figure 2:
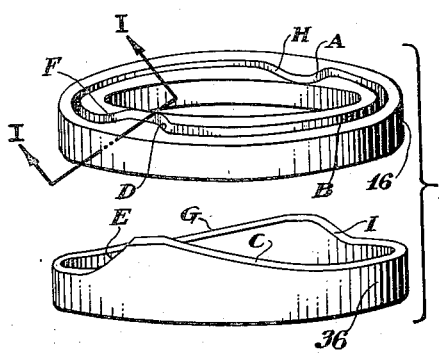

The invention will be better understood from the description of one practical embodiment thereof illustrated in the accompanying drawing, in which;

Figure 1 is a side elevation of a machine embodying the invention, the left hand half being shown in section, taken on the line I—I of Figure 2; and Figure 2 is a perspective view of the two cam devices which actuate the mechanism of Figure 1.

The machine shown comprises a base 1 provided with a centrally disposed upwardly extending pedestal 2 upon which is pivoted a main frame 3 by which the bulk of the mechanism is supported. A pulley 4, driven from any suitable source of power, drives a horizontal shaft 5 journalled in the base and provided on its inner end with a bevelled gear 6 meshing with a bevelled gear 7, upon a vertical shaft 8, also journalled in the base. The upper end of this shaft 8 is provided with a pinion 9, which meshes with a ring gear 10 rigidly attached to the frame 3, and by this means rotates the frame about the pedestal.

A plurality of similar hobbing mechanisms are mounted on the frame and travel with it about the pedestal, the arrangement being similar in general to that shown in the patent to Homer C. Warner, Number 1,836,210, issued December 15, 1931.

Each hobbing mechanism consists of a tool spindle 11 mounted in horizontal bearings carried by a carriage 12, slidable radially of the frame, on horizontal ways 13. Each tool carriage is provided with an inwardly extending arm 14 provided on its inner end with a roller 15 which runs in a cam-shaped groove in a sleeve 16 rigidly attached to the pedestal, the shape of the cams being better shown in Figure 2.

The tool spindle is rotated by means of gears 17 driven by a bevelled gear 18 carried upon a radial shaft 19 which is splined to a bevelled gear 20 carried within the frame, and driven by a bevelled gear 21 on the lower end of a vertical shaft 22 journalled in the frame.

The shaft 22 is driven at its upper end by gears 23 and 24, the latter of which is keyed to a vertical shaft 25 having at its upper end a bevelled gear 26 meshing with a bevelled gear 27 upon a horizontal shaft 28 provided at its outer end with a gear 29 and driven by the gear 30 operated by the shaft of an electric motor 31. The motor 31 is mounted upon the top of the frame, and gears 24 and 30 may be connected to each hobbing unit, the power being transmitted to the several gears 24 by idlers in the part of the frame.

A vertical work spindle 32 is supported by carriage 33 slidable upon vertical ways 34 on the side of the frame. The work carriage is provided at its lower end with a roller 35 running upon a circular cam-shaped track 36 and so raises and lowers the carriage as the frame travels around the pedestal.

The work spindle has keyed to it, within the carriage, a bevelled gear 37 driven by another bevelled gear 38 which is keyed to a radially extending shaft 39. This shaft is journalled within an inward extension 40 of the carriage and is provided at its inner end with a bevelled gear 41 meshing with a bevelled gear 42, also journalled in the extension 40.

The bevelled gear 42 is splined to a vertically extending shaft 43, provided with a helical spline, and journalled at its lower end within the frame 3 and at its upper end in a bracket 44 rigidly attached to the frame.

The upper end of shaft 43 is provided with a pinion 45 which, through back gears 46, supported by the frame, is driven by a pinion 47 carried on the lower end of a shaft 48, also journalled in the frame. The upper end of shaft 48 has keyed to it a bevelled gear 49 meshing with gear 20 above referred to.

It will, therefore, be seen that if the carriage 33 be held in stationary position when motor 31 is operated, this motor will drive, through the gearing described, both the cutter spindle and work spindle, these two rotating at predetermined relative speeds and that these speeds may be adjusted by proper selection of gears 45, 46 and 47 or of change gears anywhere in the gear train between the spindles. If, however, the carriage is moved up or down upon the ways 34, gear 42 will be rotated by its engagement with the helical spline in shaft 43, varying the relative rotation of the work and tool spindles. This spline is chosen to rotate the spindles relative each other an amount corresponding to the desired helix angle of a helical gear which is to be cut, the work gear supported on spindle 42 being given, for each increment of axial movement, a corresponding increment of rotational movement relative the cutter or hob. This increment depends solely upon the movement of the carriage, so that any irregularities in the feed will not effect the proper cutting of the helix angle upon the work blank.

Obviously, an elongated helical gear could be substituted for the spline shaft, this gear meshing with a gear driving the work spindle, and in this respect the spline shaft is an equivalent of such a helical gear.

Also obviously the spline shaft may be interposed at any place between the spindles. It may, as shown, be held stationary while the spindle carrying element engaging it is moved axially relative it, or the spline shaft itself might be secured to the moving part and caused to move through a gear held against axial displacement to impart rotation thereto. Similar arrangements could be made with a helical gear such as just mentioned.

The usual means for adjusting the spindles axially, laterally and angularly, for changing the gear ratios, for supporting the upper end of the work spindle, etc., have not been illustrated, but of course would be provided as desired in practice and are now well enough understood that their description is believed unnecessary.

In operation, the roller 15 is moved outwardly by part A of cam 16 and maintained in its fed position by part B in this cam. While the cutter is being held in this position, the work gear or blank is fed upwardly past it by roller 35 traversing the upward slope C of cam 36. When the roughing cut has been finished, portion D of cam 16 retracts the cutter, and at the same time roller 35 passes onto the downward slope E permitting the work carriage to drop back to its lowermost position. The cutter is then fed in by the motion of its roller along portion F of cam 16 for the finishing cut, and the work carriage again fed upwardly by roller 35 traversing upwardly inclined portion G of cam 36. At the end of the finishing cut, the tool is retracted by portion H of its cam and roller 35 descends incline I of cam 36 to return the parts to their original positions.

While I have described the illustrated embodiment of my invention in some particularity, this is done by way of illustration only, it being obvious that many other embodiments will readily occur to those skilled in this art, and I do not, therefore, limit myself to the precise details shown and described, but claim as my invention all embodiments, variations and modifications coming within the scope of the subjoined claims.

I claim:

1. A hobbing machine comprising a work spindle and a tool spindle, means for imparting a relative motion to said spindles axially and radially of the work spindle respectively, a gear train connecting said spindles having a single definite gear ratio and including two elements, one driving the other through helical engaging surfaces, one of said elements being movable axially relative the other upon axial movement of the spindles whereby an increment of rotation is imparted the spindles relative each other for every increment of relative axial movement.

2. A hobbing machine comprising a frame, a slide movable thereon, a spindle carried by said slide, a spindle carried by said frame, gearing between said spindles having a single definite gear ratio including two members in driving engagement with each other, one journalled on the frame and the other journalled on the slide, and having helical engaging surfaces and driving means for said spindles.

3. A rotary hobbing machine comprising a bed, a base rotatable on said bed, a spindle journalled on said base, a slide movable upon ways upon said base, a spindle on said slide, gearing between said spindles, each element of said gearing having its axis fixed relative the axes of both spindles and including a splined shaft having a helical spline, a gear mounted upon said spline shaft and having driving engagement therewith, the gear being journalled in the slide and the shaft being journalled in the base.

4. A hobbing machine comprising a work and tool spindle, one of said spindles being movable relative the other in a direction of the axis of the work spindle, a gear train between said spindles having a single definite gear ratio comprising two elements having positively engaging helical surfaces, one stationary and the other movable with said movable spindle.

5. A rotary hobbing machine comprising a bed, a base rotatable on said bed, a hobbing mechanism carried by said base comprising a work spindle and a tool spindle, means for imparting a relative motion to said spindles, axially and radially of the work spindle, respectively, a gear train connecting said spindles and including two elements, one driving the other through helical engaging surfaces, one of said elements being movable axially relative the other upon axial movement of the spindles whereby an increment of rotation is imparted the spindles relative each other for every increment of relative axial movement.

6. A rotary hobbing machine comprising a bed, a base rotatable on said bed, a hobbing mechanism carried by said base comprising a work and a tool spindle, one of said spindles being movable relative the other in a direction of the axis of the work spindle, a gear train between said spindles comprising two interengaging elements having meshing helical surfaces, one stationary and the other movable with said movable spindle.

HARVEY R. HAWGOOD.